United States Patent [19]

Dines et al.

[11] 4,323,480

[45] Apr. 6, 1982

[54] METHOD OF PREPARING DI AND POLY CHALCOGENIDES OF GROUP IVB, VB, MOLYBDENUM AND TUNGSTEN TRANSITION METALS BY LOW TEMPERATURE PRECIPITATION FROM NON-AQUEOUS SOLUTION AND THE PRODUCT OBTAINED BY SAID METHOD

[75] Inventors: Martin B. Dines, Westfield, N.J.; Russell R. Chianelli, Brooklyn, N.Y.

[73] Assignee: Exxon Research & Engineering Co., Florham Park, N.J.

[21] Appl. No.: 151,450

[22] Filed: May 19, 1980

Related U.S. Application Data

[63] Continuation of Ser. No. 59,548, Jul. 23, 1979, abandoned, which is a continuation of Ser. No. 641,424, Dec. 17, 1975, abandoned.

[51] Int. Cl.$^3$ .................... B01J 27/02; H01B 1/06; C01B 17/00; C01B 19/00
[52] U.S. Cl. ........................ 252/439; 252/520; 423/561 R; 423/508; 423/509; 429/218
[58] Field of Search .............. 252/439, 520; 423/561 R, 508, 509; 429/218

[56] References Cited

U.S. PATENT DOCUMENTS

| | | | |
|---|---|---|---|
| 1,948,408 | 2/1934 | Watts et al. | 23/236 |
| 2,145,657 | 1/1939 | Ipotieff et al. | 196/24 |
| 2,354,742 | 8/1944 | Cunningham | 23/134 |
| 2,448,740 | 9/1948 | Schwartz | 252/313 |
| 2,647,858 | 8/1953 | Weisz | 198/44 |
| 2,654,696 | 10/1953 | LaPorte | 196/78 |
| 2,805,917 | 9/1957 | Nitschse | 23/50 |
| 2,902,360 | 9/1959 | Juda | 75/84 |
| 3,026,175 | 3/1962 | Kulifoy | 23/50 |
| 3,140,994 | 7/1964 | Deer et al. | 208/254 |
| 3,161,585 | 12/1964 | Gleim | 208/264 |
| 3,252,894 | 5/1966 | Gatses et al. | 208/264 |
| 3,252,895 | 5/1966 | Gleim et al. | 208/264 |
| 3,275,567 | 9/1966 | Keith et al. | 252/439 |
| 3,291,720 | 12/1966 | Dobrec et al. | 208/89 |
| 3,306,701 | 2/1967 | Anderson et al. | 23/50 |
| 3,320,157 | 5/1967 | Arey et al. | 208/249 |
| 3,331,769 | 7/1967 | Gatsis | 208/210 |
| 3,336,386 | 8/1967 | Dovell et al. | 260/576 |
| 3,338,822 | 8/1967 | Graszek | 208/310 |
| 3,441,500 | 4/1969 | Wunderlich | 208/213 |
| 3,453,217 | 7/1969 | Kozlowski et al. | 252/430 |
| 3,509,213 | 4/1970 | Greenfield | 260/563 |
| 3,538,161 | 11/1970 | Dovell | 260/576 |
| 3,538,162 | 11/1970 | Dovell | 260/576 |
| 3,622,497 | 11/1971 | Gleim | 208/108 |
| 3,622,498 | 11/1971 | Staifn et al. | 208/108 |
| 3,657,111 | 4/1972 | Gleim | 208/106 |
| 3,663,431 | 5/1972 | Wogner | 208/143 |
| 3,677,970 | 7/1972 | Mertrweller et al. | 252/431 |
| 3,682,813 | 8/1972 | Dem et al. | 208/59 |
| 3,686,137 | 8/1972 | Gatti | 252/437 |
| 3,694,352 | 9/1972 | Gleim | 285/235 |
| 3,714,339 | 1/1973 | Vecht | 423/509 |
| 3,761,397 | 9/1973 | Gatti | 208/143 |
| 3,761,425 | 9/1973 | Boessler et al. | 252/439 |
| 3,763,043 | 10/1973 | Thompson | 252/31 |
| 3,766,064 | 10/1973 | Gamble | 252/25 |
| 3,793,081 | 2/1974 | Varga, Jr. | 136/86 D |
| 3,840,389 | 10/1974 | Kobylenski et al. | 117/62 |
| 3,850,864 | 11/1974 | Kravitz et al. | 252/439 |
| 3,915,842 | 10/1975 | Gatsis | 208/108 |
| 3,920,743 | 11/1975 | Baessler et al. | 260/580 |
| 4,009,052 | 2/1977 | Whittingham | 429/191 |
| 4,055,630 | 10/1977 | McCoy et al. | 423/509 |
| 4,208,394 | 6/1980 | Chianolli | 423/561 R |
| 4,243,584 | 1/1981 | Naumann et al. | 252/439 |

FOREIGN PATENT DOCUMENTS

| | | |
|---|---|---|
| 1767190 | 10/1971 | Fed. Rep. of Germany . |
| 728913 | 7/1932 | France . |
| 735295 | 11/1932 | France . . |
| 2034431 | 11/1970 | France . |
| 358180 | 10/1931 | United Kingdom . |
| 362354 | 11/1931 | United Kingdom . |
| 1123136 | 4/1967 | United Kingdom . |
| 1471589 | 4/1977 | United Kingdom . |

OTHER PUBLICATIONS

Chem. Abstracts 76, p. 310.
Chem. Abstracts 85, p. 664.
"Monodispersed Tantalum Disulfide and Adsorption Complexes with Cations", Murphy et al., J. of Chem. Physics, vol. 62, #3, Feb. 1975.
"Colloidal Sulphur Compounds of Ruthenium", Jaeger, F. M. and J. H. DeBoer, Proc. Acad. Sci. Amster, pp. 95–102, 1920.
"Prep. and Crystallinity of Mo and Mo Sulfides", Wildevanck et al., Zeitschrif fur Anorganishe und Allegemeine Chemie, pp. 309–318, 1964.
"Formation of Chromium (III) Sulfide", S. M. Veller, Ukrain Chem. Zhur 11 (8) pp. 23–27 (1936).
"The Synthesis and Characterization of Inorganic Compounds", Chap. 5 Solvents, W. L. Jolly, Prentice-Hall Inc., pp. 97–121.
"Extractive Metallurgy", vol. 2, Hydrometallurgy F. Habashi, Science Publishers, p. 216.
"A Study in Tellarides", C. A. Tibbals, Jr., J. Am. Chem. Soc. 31, pp. 902–913 (1909).
"Application of Selenium Salts in Inorganic Analysis", Taimni and Rokshpol, Analytica Chemica Acta 25, pp. 438–447, 1961.
"Comprehensive Treatise on Inorganic and Theoretical Chemistry", vol. XI, 1931, Mellor.
"Comprehensive Treatise on Inorganic and Theoretical Chem.", vol. IX, pp. 814–818, Mellor.
"Comprehensive Treatise on Inorganic and Theoretical Chem.", vol. VII, pp. 90–91, Mellor.
"Zur Reindarsatellung von Uranverbindungen", E. Wilke Dorfurt, Wessenschaftliche Veroffetl Siemens Werken, vol. 1, pp. 143–146 (1920).
"Notiz uber MOS$_3$", Biltz et al., Zeitschrift fur Anorganische und Allgemeine Chemie, Band 248, pp. 172–174 (1941).
"Die Darstellung von Seleniden aus Selenwasserstuff und Metallsalzlosungen", Moses and Atynoki, Monotsh 54, pp. 235–250 (1925).
"Die Darstellung von Metalltelluriden aus Telluriwasserstuff und Metallsalzlosungen", Brukl, Monatsh 45, pp. 471–484 (1925).

"Uransulfide", Strotzer, Schneider and Biltz Zeitschrift fur Anorganishe und Allgemeine Chemie, 243, pp. 307-321 (1949).

"Preparation of Metal Sulphides from Organic Solvents", Lutz and Haeuseler, Z. Naturforsch, 26b, pp. 1096-1097 (1971).

"Preparation of Chromium Sulphide from Organic Solvents", Lutz, Haenseler and Becker, Z. Naturforsch 29b, pp. 385-388 (1974).

The Role of Fe Sulfides in the Accumulation of Mo in Sedimentary Rocks of the Red. Zone, D. F. Korolev, Geochemistry, No. 4, pp. 452-463 (1958).

"Some Properties of Thiomolybdic Solutions", Ponomarev et al., Sbornik Nauch, Gorno-Met. Inst. Geol. Gorneo Delo, Met No. 16, pp. 369-376 (1959).

"Preparation and Properties of Some Ternary Selenides and Te of Rh", Plovnick et al., Inorganic Chem. 7, No. 12, pp. 2596-2598 (Dec. 1968).

"A High-Pressure Form of Palladium Disulfide", Munson et al., Inorganic Chemistry 8, No. 5, pp. 1198-1199 (May 1969).

"Critical Examination of Platinum Sulfide Precipitation", Jackson, D. S. and F. E. Beamish, Analytical Chem, 22, No. 6, pp. 813-817 (Jun. 1950).

"Thiometallates of the Group-Eight Metals", L. R. Pittwell, Nature 207, 1181-1182 (1965).

"Crystalline Polysulfides of Heavy Metals", Hofmann et al., Berichte 36, 3090 (1903).

"Crystalline Polysulfides of Heavy Metals", Hofmann et al., Berichte 37, 245 (1904).

"Rhenuim Sulfides or Liquid Phase Hydrogenation Catalysts, A Comp. of MoS and $CoS_x$", Broadbent, et al., J.A.C.S. (1954) pp. 1519-1523.

"Feber unige den Sulfiden und Schwefebasen analoge Selenverbindungen", Uelsmann et al., 116, 122-127 (1980).

"Note on Le and Te of In and Rh", W. Biltz., Z. Anog. Allgem. Chemie. 233: 282-285 (1937).

Chem. Abstracts 28, 1934, 2634.

Chem. Abstracts 79, p. 548.

Chem. Abstracts 81, p. 383.

*Primary Examiner*—Delbert E. Gantz
*Assistant Examiner*—William G. Wright
*Attorney, Agent, or Firm*—Joseph J. Allocca

[57] ABSTRACT

Finely divided, high surface area, small crystallite (0.1 micron or less) di- and poly-transition metal chalcogenides are prepared by mixing in the absence of an aqueous solvent a transition metal salt with a source of chalcogen yielding a precipitate. The salt and the chalcogen source can be mixed either neat or in the presence of a nonaqueous solvent. The precipitate which results before removal of the anion salt is a finely divided product.

24 Claims, No Drawings

METHOD OF PREPARING DI AND POLY CHALCOGENIDES OF GROUP IVB, VB, MOLYBDENUM AND TUNGSTEN TRANSITION METALS BY LOW TEMPERATURE PRECIPITATION FROM NON-AQUEOUS SOLUTION AND THE PRODUCT OBTAINED BY SAID METHOD

RELATED APPLICATION

The instant application is a continuation under 37 CFR 1.60 of Ser. No. 059,548 filed July 23, 1979 which was a continuation under 37 CFR 1.60 of Ser. No. 641,424 filed Dec. 17, 1975, now both abandoned.

The anion salt may be removed by any technique common to the art, pumping under vacuum being one such technique.

Di- and poly-chalcogenides of the formula $MX_y$ wherein M is a metal selected from the group consisting of Group IVb, Vb, molybdenum and tungsten transition metals of the Periodic Table of the Elements (Sargent-Welche Periodic Table, Copyright 1968), X is a chalcogen selected from the group consisting of sulfur, selenium and tellurium and y is a number ranging from about 2 to about 4, are prepared by the low temperature nonaqueous precipitation of said $MX_y$ compounds from mixtures of the salts of said Group IVb, Vb and molybdenum and tungsten transition metals, the anions of the salts preferably being halide, acetate, carboxylate, and nitrates, sulfates, etc. with slurries or solutions of sources of sulfide, selenide or telluride ions. Said mixing occurs in the absence of aqueous solvents. The products of the low temperature nonaqueous precipitation are distinquished from materials prepared by the high temperature solid state methods of the prior art by exhibiting markedly different surface area and crystallinity characteristics. A number of compounds of the formula $MX_y$, wherein the constituents are as defined above, may be prepared via the low temperature nonaqueous technique disclosed which cannot be synthesized via the methods of the prior art, i.e., aqueous methods or high temperature solid state methods. $VS_2$ is a compound previously not preparable.

The compounds which are prepared by the instant process also include di- and poly-chalcogenides wherein the components are in a stoichiometric relationship one to another.

The preferred compounds are $TiS_2$, $ZrS_2$, $HfS_2$, $VS_2$, $NbS_2$, $TaS_2$ and $MoS_2$.

FIELD OF THE INVENTION

Finely divided, high surface area, small crystallites (~0.1 micron or less) di- and poly-transition metal chalcogenides are prepared by mixing in the absence of an aqueous solvent, a transition metal salt with a source of chalcogen yielding a precipitate. The salt and the chalcogen source can be mixed either neat or in the presence of a nonaqueous solvent. The precipitate which results, before removal of the anion salt is a finely divided product.

The anion salt may be removed by any technique common to the art, pumping under vacuum being one such technique.

A method for the preparation of finely divided, small crystallite size (~0.1 micron or less) chalcogenides comprises preparing a neat or nonaqueous reactive solution (i.e. running the reaction in the absence of an aqueous solvent) or slurry wherein is added (1) a transition metal salt, the transition metal being selected from the group consisting of Group IVb, Vb and molybdenum and tungsten of the Periodic Table and the anion of the salt preferably selected from the group consisting of halide, acetate, carboxylate, nitrate and sulfate, most preferably chloride, and (2) a source of sulfide, hydrosulfide ($HS^-$), selenide and/or telluride ions, said source conveniently being $Li_2S$, $NaHS$, $NH_4HS$, $(NH_4)_2S$, $Na_2S$, $Li_2Se$, $(NH_4)_2Se$, $Li_2Te$, $(RNH_3)_2S$, $(R,R'NH_2)_2S$, $(R,R',R''NH)_2S$ wherein R, R', R'' are the same or different and are selected from the group consisting of $C_1$–$C_{20}$ alkyl or $C_6$–$C_{20}$ aryl, preferably $C_1$–$C_8$ alkyl or $C_6$–$C_{12}$ aryl and the nonaqueous solvent (when one is used) is preferably selected from the group consisting of ethers of from $C_4$ to $C_8$, acetonitrile, benzonitrile, pyridine, propionitrile, N-methylformamide, dimethylformamide (DMF), 1,2-dimethoxyethane, propylene carbonate, ammonia, aromatics of 6–20 carbons, preferably $C_6$–$C_{12}$, molten sulfur, sulfur dioxide, diglyme, ethylacetate, esters of from $C_4$ to $C_5$, sulfolane, dimethylsulfite, tributylphosphate. $C_1$–$C_{30}$ amines, preferably $C_1 \rightarrow C_{20}$, $C_5$–$C_{12}$ alkanes, preferably $C_6 \rightarrow C_8$, anhydrous acids, such as formic acid, glacial acetic acid, alkyl halides of from 1 to 20 carbon atoms and aryl halides of from $C_6$ to $C_{20}$. Tetrahydrofuran (THF), dimethylformamide (DMF), chlorobenzene, chloroform, pyridine and acetone may be used as solvents of choice. Alternatively, the reaction may be run neat, that is, in the absence of any solvent. The reaction proceeds, spontaneously upon mixing, at low temperature, preferably less than 400° C. and at atmospheric pressure. The products may be isolated by filtration and washing using excess solvents (when solvents are used) or by pumping off the halide if it is volatile. The products obtained by the above method are di and poly chalcogenides and stoichiometric di- and poly-chalcogenides.

PRIOR ART

The Group IVb, Vb and molybdenum and tungsten transition metals di- and poly-chalcogenides ($MX_y$ wherein M is Ti, Zr, Hf, V, Nb, Ta, Mo and W and X is S, Se and Te and y is from about 2 to 4) have traditionally been prepared when preparation was possible at all, by high temperature reactions. The di- and poly-chalcogenides have attracted great interest because of their highly anisotropic properties and intercalation properties. Intercalates made using various chalcogenides are useful as lubricants, battery cathodes and superconductors. (See Gamble et al U.S. Pat. No. 3,766,064 herein incorporated by reference). However, a major drawback in the use of chalcogenides is the difficulty encountered in their preparation. These materials of composition $MX_2$ cannot be prepared in aqueous solution because of the susceptibility of the $M^{+3,4,5}$ ion to hydrolysis or to formation of complex oxo ions (Cotton and Wilkenson, "Advanced Inorganic Chemistry" 2d ed. Interscience, New York, 1966). For example, $TiCl_4$ in water will immediately react to form white insoluble $TiO_2$ and HCl. While other metal sulfides such as CuS, $SnS_2$ and $As_2S_3$ can be precipitated from aqueous solutions, the transition metal di-chalcogenides of Group IVb, Vb and molybdenum and tungsten cannot be precipitated from aqueous solutions (but note, hydrated $MoS_3$ has been precipitated from aqueous solutions (A. F. Clifford, "Inorganic Chemistry of Qualitative Analysis". Prentice-Hall, Inc. 1961).

By comparison, low temperature precipitation of solids from solution has the advantages of low cost and also permits preparation of a wide variation of materials of composition and properties not accessible by other means. Recently low temperature precipitation has been applied in preparing materials traditionally prepared by solid state or metallurgical methods. For example, ternary ferrites and titanites can be precipitated from aqueous solutions (P. E. D. Morgan, J. Am. Ceram. Soc. 57, 11, 499 (1974)) whereas previously these materials were prepared by solid state technique at high temperatures. Another example is the preparation of intermetallic compounds by reduction of salts of the desired compounds in aqueous solution at 1 atm. and 100° C. (S. M. Kulifay, J. Am. Chem. Soc. 83, 4916 (1961)). Materials prepared by this method are finely divided and extremely active.

The materials prepared by the nonaqueous precipitation technique of the instant invention are finely divided, small composite crystallites. The size of the crystallites obtained before further treatment is less than about 0.10 micron (1000 Å), preferably less than 0.05 micron (500 Å) that is, crystallite material which is amorphous, i.e. noncrystalline, to X-ray diffraction [see "X-Ray Diffraction by Polycrystalline Materials" Ed. H. S. Peiser, H. P. Rooksby and A. J. C. Wilson, Chapter 17, A. R. Stokes, pg. 409, 1955, Pub. J. Wright, London]. Crystallites of 0.05 micron (500 Å) or less, exhibit blurred X-ray patterns, or no X-ray pattern at all. The materials of the instant invention exhibit this behavior. Products obtained by prior art, high temperature techniques do not exhibit such X-ray broadening and therefore, cannot be as finely divided or of such small crystallite size; however, materials of the instant invention may be converted to crystalline materials by further heat treatment.

SUMMARY OF THE INVENTION

Finely divided, large surface area, small crystallite diameter (i.e. 0.1 micron (1000 Å), preferably less than 0.05 micron (500 Å) and stoichiometric di- and poly-chalcogenides of the formula $MX_y$ wherein M is a metal selected from the group consisting of Group IVb, Vb and molybdenum and tungsten transition metals of the Periodic Table of the Elements, X is a chalcogenide selected from the group consisting of sulfur, selenium and tellurium and y is a number ranging from about 2 to about 4 are prepared by the low temperature nonaqueous precipitation of said $MX_y$ compounds from solutions comprising mixtures of the salts of said Group IVb, Vb and molybdenum and tungsten transition metals, common anions of the salts being halide, acetate, carboxylate, perfluorocarboxylate, acetylacetonate, hexafluoroacetonate, sulfate, nitrate, preferably chloride, etc. with solutions of or slurries of sources of sulfide, selenide or telluride ions. The products of the low temperature nonaqueous precipitation are distinguished from materials prepared by high temperature (greater than 400° C.) methods of the prior art by exhibiting markedly different surface area and crystallinity characteristics. A number of compounds of the formula $MX_y$ wherein the constituents are as defined above may be prepared via the low temperature nonaqueous techniques disclosed which cannot be synthesized via the methods of the prior art, i.e. aqueous methods or high temperature methods. $VS_2$ is one such compound which cannot be prepared by methods common in the prior art.

A method for the preparation of di- and poly-chalcogenides and stoichiometric di- and poly-chalcogenides comprises preparing a nonaqueous reactive solution or slurry wherein is added (1) a transition metal salt, the transition metal being selected from the group consisting of Group IVb, Vb and molybdenum and tungsten of the Periodic Table and the salt is selected from the group consisting of halide, acetate, carboxylate, perfluorocarboxylate, acetylacetonate, hexafluoroacetylacetonate and (2) a source of sulfide, selenide and/or telluride ions, said sources conveniently being $Li_2S$, hydrosulfide salts (i.e. NaHS, $NH_4HS$), $(NH_4)_2S$, $Na_2S$, ($Li_2Se$, $Li_2Te$, $(NH_4)_2Se$), $(RNH_3)_2S$, $(R,R'NH_2)_2S$, $(R,R',R''NH)_2S$ wherein R, R', R'' are the same or different and are selected from the group consisting of $C_1$–$C_{20}$ alkyl, preferably $C_1$ to $C_8$ or $C_6$–$C_{20}$ aryl, preferably $C_6$ to $C_{12}$, and a nonaqueous solvent selected from the group consisting of ethers of from $C_4$ to $C_8$, acetonitrile, benzonitrile, dimethylformamide (DMF), propylene carbonate, aromatics of $C_6$–$C_{20}$ carbons, preferably $C_6$ to $C_{12}$, ammonia, molten sulfur, diglyme, sulfur dioxide, ethylacetate, esters of from $C_4$ to $C_8$, sulfolane, tributylphosphate, anhydrous acids, such as formic acid, glacial acetic acid, alkylhalides of from $C_1$ to $C_{20}$, preferably $C_1$ to $C_5$ and arylhalides of from $C_6$ to $C_{20}$, preferably $C_6$ to $C_{10}$, pyridine, propionitrile, N-methylformamide, dimethylsulfite, $C_1$–$C_{30}$ amines, preferably $C_1$ to $C_{20}$, $C_5$–$C_{12}$ alkanes, preferably $C_5 \rightarrow C_8$. The solvents of choice are tetrahydrofuran (THF), dimethylformamide (DMF), chlorobenzene, chloroform, pyridine and acetone. Alternatively, the reaction may be run neat, that is, in the absence of any solvent. The reaction proceeds spontaneously upon mixing at low temperature, preferably less than 400° C. but greater than −78° C., and at atmospheric pressure. The products may be isolated by filtering, washing with excess solvents or by pumping off the anion salts if they are volatile. In situations wherein the sulfide, selenide and/or telluride ion sources are already solutions, no additional solvent is needed during the course of the reaction although a volume of nonaqueous solvent (i.e. one which does not offer or accept protons) may be added so as to facilitate product isolation.

The instant invention relates to the low temperature (−78° C. to 400° C.) precipitation from nonaqueous solution of the Group IVb, Vb and molybdenum and tungsten transition metal di- and poly-chalcogenides, more particularly, the di-chalcogenides and most particularly, the disulfides from nonaqueous solvents and to the products obtained by such precipitation. Typically, a metal salt of the transition metal such as $TiCl_4$ is reacted with a solution of, or a slurry of a convenient sulfide, selenide or telluride ion source such as $Li_2S$, hydrosulfide salt (i.e. $NH_4HS$, NaHS), $(NH_4)_2S$, $Na_2S$, $(RNH_3)_2S$, $(R,R'NH_2)_2S$, $(R,R',R''NH)_2S$, wherein R, R' and R'' are the same or different $C_1$–$C_{20}$ alkyl or $C_6$–$C_{20}$ aryl, preferably $C_1$ to $C_8$ alkyl or $C_6$–$C_{12}$ aryl, $Li_2Se$, $Li_2Te$, $(NH_4)_2Se$ in a nonaqueous solvent such as THF, ethers, acetonitrile, DMF, molten sulfur, etc. The reaction which takes place is:

$$MZ_4 + 2A_2X \xrightarrow[\text{solvent or neat}]{\text{nonaqueous}} MX_2 \downarrow + 4AZ$$

M = IVb, Vb or molybdenum or tungsten transition metals;

A = alkali metal, $NH_4^{30}$, $R,R',R''NH^+$, $R,R'NH_2^+$, or other cation as defined above;
Z = convenient anion such as Cl, Br, I, acetate, carboxylate, nitrate, etc., as recited above;
X = sulfur, selenium or tellurium.

Any convenient source of $M^{+2}\rightarrow^{+5}$, preferably $M^{+4}$ and $M^{+5}$ can be used. Complexes formed in solution which can be isolated as solids may be used as $M^{+4}$ source. In some cases (such as Nb and Ta) a pentavalent salt may be used directly because reduction of $M^{+5}$ to $M^{+4}$ occurs, for example:

$$NbCl_5 + 2.5Li_2S \rightarrow NbS_2 \downarrow + 5LiCl + 0.5S.$$

The transition metal salts are desirably, although not necessarily, soluble in organic solvents such as THF since it is possible to conduct the reaction neat in all cases. Therefore, solution concentrations are not critical. Anions, which are envisioned as generating the metal salt, are selected from the group consisting of halides, selected from the group consisting of fluorine, chlorine, bromine and iodine, acetates, carboxylates, perfluorocarboxylates, amines, acetylacetonates, hexafluoroacetylacetonates and nitrates, sulfates, wherein in all cases, the carbonaceous moiety of the anion is a $C_1$ to $C_8$ hydrocarbon or fluorocarbon, preferably a $C_1$ to $C_3$ hydrocarbon or fluorocarbon.

Typical nonaqueous solvents which may be used when neat reactions are undesired are acetonitrile, benzonitrile, propionitrile, alkyl halides of from 1 to 20 carbon atoms, arylhalides of from $C_6$ to $C_{20}$ carbon atoms, 1,2, dimethoxyethane, diglyme, N-methylformamide, dimethylformamide, ethers of from $C_4$ to $C_8$, ammonia, molten sulfur, sulfur dioxide, ethylacetate, esters of from $C_4$-$C_8$, aromatics of $C_6$-$C_{20}$ carbons, preferably $C_6$ to $C_{12}$, most preferably benzene, pyridine, sulfolane, tributylphosphate, anhydrous acids such as formic acid, glacial acetic acid, propylene carbonate, tributylphosphate, dimethylsulfite, $C_1$-$C_{30}$ amines, preferably $C_1$-$C_{20}$, $C_5$ to $C_{12}$ alkanes, preferably $C_5$-$C_8$, such as hexane. The alkylhalides are preferably of from $C_1$ to $C_5$ in size and the arylhalides are from $C_6$ to $C_{10}$ in size.

The reaction is normally but not necessarily, conducted in the absence of an excess of sulfide, selenide or telluride, although other starting materials may be present in excess. Since particle size depends on the rate of mixing of reagents, the reaction may be allowed to proceed instantly, upon total admixture of one reagent to the reaction solution yielding fine products or, upon the measured addition of small increments of one reagent to the reaction solution, the reaction not achieving totality for several days.

As previously stated, the reagents may be mixed neat, i.e., no added solvent, when this is feasible, or may be diluted with solvent. The use of solvent, therefore, is not critical to the reaction; however, when a solvent is utilized, it must be nonaqueous.

The temperature of the reaction may range from $-78°$–$400°$ C., preferably ambient (25° C.) to 300° C. These temperatures are markedly lower than those needed when preparing di-chalcogenides via solid state or gas phase methods wherein reaction temperatures up to and exceeding 1000° C. are commonplace.

The products obtained from the low temperature nonaqueous precipitation technique are di- and polychalcogenide, particularly di-chalcogenides and more particularly, disulfides, and have unique properties. The products may also be stoichiometric in character. For example, stoichiometric $NbS_2$ is difficult and/or impossible to prepare and stoichiometric $VS_2$ is impossible to prepare by high temperature methods. The particle size and crystallinity of these materials can be greatly varied by practicing the preparative methods of the instant invention. Small single crystals or high surface area powders which are amorphous to X-ray (i.e. give no X-ray pattern) can be obtained. Lack of X-ray pattern indicates a crystalline size of less than 0.05 micron (500 Å). Surface areas can be raised to the point where the di-chalcogenide will remain suspended in solution and homogeneous dispersions created. This effect can be increased by using more polar nonaqueous solvents such as DMF or basic solvents such as pyridine which have a natural tendency to attach to the sulfur layers and cause dispersions. These same solvents are those which tend to intercalate in crystalline transition metal di-chalcogenides. See Gamble et al, U.S. Pat. No. 3,766,064 for a list of such intercalation materials. Such dispersions can be gelled by proper variation of conditions or adsorbed on basic substrates such as CaO. The materials prepared by the process of the instant invention have utility as electrodes, catalysts, and are useful in the preparation of intercalation compounds which are then useful as lubricants and superconductors.

Particle Size and Crystallinity

The above-mentioned preparation allows one to choose between a wide range of particle size, crystallinity and surface area compounds. Solids may be prepared which have the following properties.

A. High surface area, small particle size and amorphous crystallinity. Such characteristics are achieved by use of a solvent which may have the ability to form intercalation complexes with the chalcogenide. Alternatively, chalcogenides formed neat or in the absence of an intercalation solvent may be treated with an intercalate to achieve the same result. Such intercalates may be a strong Lewis base such as pyridine, ammonia, $C_1$-$C_{20}$ amines, aldehydes, ketones, amides, heterocyclic bases, anilines and ethers. The intercalated chalcogenide is then subjected to heat treating at between 75°-200° C. with pumping under vacuum when necessary to drive off the intercalating solvent leaving a high surface area, small particle size amorphous chalcogenide. Example: $TiS_2$ prepared from THF and treated with pyridine (intercalate pyridine and then drive it out at 150° C.) gave an amorphous X-ray pattern which indicates a crystallite size of at least less than 0.1 micron and a Brunauer, Emmett and Teller (BET) surface area of 100 $m^2/gm$.

B. Low surface area, small particle size and amorphous crystallinity. Example: The sample $TiS_2$ as mentioned in (A) if not treated with pyridine gave an amorphous X-ray pattern and a BET surface area of 10 $m^2/gm$.

C. Low surface area, moderate particle size and high crystallinity. Example: $TiS_2$ prepared from refluxing acetonitrile yielded a $TiS_2$ X-ray pattern. The crystallinity of all materials can further be improved by annealing products.

D. Homogeneous dispersions: conditions can be arranged as above so that all or part of the di-chalcogenides remain in suspension as a homogeneous dispersion in solution. Such materials can be removed from solution by addition of a basic solid such as CaO. Example: $TiS_2$ prepared in propylene carbonate will result in a dark brown opaque dispersion of $TiS_2$. The $TiS_2$ may be absorbed by shaking the dispersion with CaO which is dark brown when dried. Correspondingly, the original solution is clear after treatment with CaO.

E. High surface area composite: Di-chalcogenide/- metal oxide solids. Composite materials may be prepared with the di- or poly-chalcogenide being absorbed on a metal oxide due to the Lewis acid nature of the chalcogenide. Example: The $TiS_2$/CaO material mentioned in Example D.

F. Gels and Glasses: Gels containing the di-chalcogenides may be produced by preparation in certain amines, such as trihexylamine. The gels produced yield glasses when the solvents are removed. Example: See Example 8.

The precipitation in nonaqueous solution causes the formation of stoichiometric products and effects reactions by virtue of the formation of insoluble precipitates, which reactions are incomplete at higher temperatures in aqueous or solid state systems. For example, $TiS_2$ may be prepared at from 450° C. to 600° C. by the reaction in the gas phase of $TiCl_4$ and $H_2S$. However, the efficiency of the reaction drops off at lower temperature because the reaction is reversible.

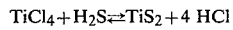

$$TiCl_4 + H_2S \rightleftharpoons TiS_2 + 4\ HCl$$

Thus, $H_2S$ is not a practical sulfiding agent at temperatures less than 400° C.

When the reaction is conducted in nonaqueous solution at low temperature, however, the formation of insoluble precipitates causes the reaction to be irreversible and quantitative to $TiS_2$. The presence of a chalcogenide salt as an intermediate is important because $H_2S$ bubbled through a solution of $TiCl_4$ at room temperature will not produce a reaction. However, if $NH_3$ gas is first bubbled through the solution the passing of $H_2S$ through the ammonia rich solution causes $TiS_2$ to precipitate. This is due to the formation of $(NH_4)_2S$ or $(NH_4)HS$ as an intermediate and $(NH_4)Cl$ is the side product resulting from ion exchange. Thus, $NH_3$ mediates the reaction although $(NH_4)_2S$ is not necessarily actually isolated. If $NH_3$ and $H_2S$ are first coreacted, the intermediate salt is formed.

The product $MX_y$ wherein M and X are as previously described and y ranges from about 2 to about 4 inclusive, preferably 2, is separated from the anion salts which are conformed by filtering and using excess solvent or by pumping off the anion salts if they are volatile. If LiCl is the product anion salt coprecipitated, excess solvent will dissolve it. If $NH_4Cl$ is the coproduct, pumping under vacuum will remove it (or washing may be used). However, pumping under vacuum may cause sulfur to be removed from the lattice to a greater or lesser extent. For example, $VS_2$ is not stable at higher temperatures. Pumping, as purification, utilized for $VS_2$ at 150° C. will cause sulfur to be removed which sulfur was supporting the 1:2 stoichiometric of the starting $VS_2$ and thereby providing a route to higher surface area, sulfur deficient compounds.

If the excess solvent used and coproduct generated in the formation of compounds of the formula $MX_y$ are not removed, the combination of the compounds of the formula $MX_y$ and the coproducts constitute a battery system in which the coproducts may function as the electrolyte.

For example, in a system generating $TiS_2$ as product, the starting materials are $TiCl_4$ and a sulfur source such as $Li_2S$. Typically, the electrolyte involves the lithium salt of a strong acid (anion = $^\ominus PF_6$, $^\ominus BF_4$, $^\ominus SO_3CF_3$, etc.) in an organic solvent such as DME, dioxalane or other ethers or mixtures thereof, the requirement being that the salt has sufficient solubility in the solvent to behave as a good $Li^+$ conductor. The $Ti^{+4}$ salt of the desired electrolytic anion ($^\ominus PF_6$, $^\ominus BF_4$, $^\ominus SO_3CF_3$, $Cl^-$, $Br^-$, $I^-$, $ClO_4^-$) is contacted with the $Li_2S$ in the organic solvent to be used in the electrolyte, thus generating $TiS_2$ (to be used in the fabrication of the active cathode) and as coproduct LiY (Y = electrolyte anion) in the organic solvent. By so doing, both the cathodic material and the electrolyte are simultaneously produced. Any contamination of the precipitate ($TiS_2$ in the above discussion) by the solution will not hamper its function, but will enhance it since wetting of the cathode by the electrolyte is desirable.

The invention can be represented by the following equation for the $TiCl_4$ system, but it must be recognized that this disclosure is relevant for the other systems described as preparative of compounds of the formula $MX_y$:

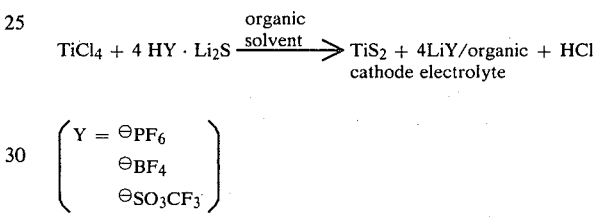

Treatment of the $TiS_2$ to fabricate a cathode and insertion of an anode (such as Li) will yield a battery.

EXAMPLES

All of the preparative work described was carried out either in a dry box or under a blanket of nitrogen. Both the starting metal (+4) and (+5) compounds and the sulfides and selenides thus afforded are sensitive to moisture and oxygen, especially in finely powdered form as results from the heterogeneous precipitation method described. All solvents were dried by standard techniques prior to use, and anhydrous reagents were always employed.

EXAMPLE 1

Preparation of $TiS_2$ ($ZrS_2$, $HfS_2$ and $VS_2$)

The following example employs as a starting material $TiCl_4$. It was found that the procedure worked equally well for $ZrCl_4$, $HfCl_4$, $MoCl_4$ or $VCl_4$. A solution of 10 millimoles of $TiCl_4$ (1.9 g) in tetrahydrofuran (75 ml) was made up in a dry box ($TiCl_4$ is not stable in air or moisture). To this stirred solution at room temperature was added 0.96 g (20 millimoles) of lithium sulfide. The yellowish solution immediately began to darken. The reaction was allowed to proceed several hours although it was essentially complete within one hour. The resulting dark brown solid was filtered and washed with 10 ml THF. From the combined filtrates 83% of calculated ideal yield of lithium chloride was isolated after evaporation of the solvent. An elemental analysis of the dark brown powder remaining after drying revealed it to be $TiS_2$ containing one-half mole of solvent tetrahydrofuran and less than 5% by weight LiCl. The analysis or other compounds prepared is listed below.

TABLE I

| Analyses | | Ti | S | Li | Cl | C | H |
|---|---|---|---|---|---|---|---|
| TiS$_2$ (LiCl . 3THF)$_{0.25}$ | Calc | 27.18 | 36.23 | 1.00 | 5.02 | 20.38 | 3.39 |
| | Found | 27.37 | 36.19 | 1.27 | 4.41 | 16.73 | 2.93 |
| BET surface area 14.2 m$^2$/g | | | | | | | |
| MoS$_2$ | | Mo | S | → | MoS$_{2.42}$ | (some unreacted | |
| | | 38.37 | 31.02 | | | Li$_2$S present) | |
| NbS$_2$ | | Nb | S | → | NbS$_{1.97}$ | ratio | |
| | | 36.82 | 24.89 | | | | |
| VS$_2$ | | V | S | = | VS$_{2.0}$ | | |
| | | 27.50 | 34.70 | | | | |

The solvent could be removed by warming and pumping. This product was found to absorb a mole-equivalent of ammonia in about five minutes (as opposed to days or weeks for TiS$_2$ prepared by conventional means). No x-ray diffraction pattern was seen for the material due to its small crystal size (<0.1η). The found BET surface area was about 10 m$^2$/gm which could be raised to about 100 m$^2$/gm by treating with pyridine and filtering and pumping to remove pyridine.

Other solvents which could be substituted for tetrahydrofuran were acetonitrile, propylene carbonate, acetic acid, dimethylformamide (DMF) or no solvent at all (run in excess TiCl$_4$), the reaction being run neat. In DMF and propylene carbonate a dispersion resulted in addition to solid.

When sodium sulfide was substituted for lithium sulfide, the reaction required much more time at room temperature and the removal of the side product, sodium chloride from the dark TiS$_2$ was achieved by washing with 12% acetic acid. Alternatively, the sulfide source could be ammonium sulfide (prepared in situ by first adding excess ammonia to a tetrahydrofuran solution of TiCl$_4$ and subsequently bubbling in hydrogen sulfide). The side product in this latter case—ammonium chloride—could be removed by sublimation at 150° C. (0.1 torr).

If the crystallinity of the product is desired to be enhanced, the dry powder can be partially annealed by heating several days at a temperature of 400° C. or less in inert atmosphere. By this process, a product exhibiting the x-ray diffraction pattern typical of TiS$_2$ was obtained.

Yet another means of enhancing the crystallinity of the product is to employ a Soxhlet apparatus whereby the Li$_2$S is placed in a thimble over a refluxing solution of TiCl$_4$ in tetrahydrofuran. Platelets of TiS$_2$ thus result after several days in the lower solution.

Additional corroboration of the products is found in their (mull) infrared spectra. Thus, for instance TiS$_2$ as obtained by the procedure described is essentially identical to that seen for a sample of TiS$_2$ as obtained from Alfa Inorganics. The latter shows a broad band centered at 400 cm$^{-1}$ due to the Ti-S bond. The product of TiCl$_4$ and Li$_2$S has a less broad band at 375 cm$^{-1}$ (the breadth is diminished by similar crystal size).

EXAMPLE 2

Preparation of TiS$_2$ (Zr$_2$, HFS$_2$ and VS$_2$)

The following example employs as a starting material TiCl$_4$. It was found that the procedure worked equally well for ZrCl$_4$, HFCl$_4$ or VCl$_4$. 300 ml of 0.2 M TiCl$_4$ in acetonitrile was slowly added (drop/sec) to a refluxing solution of 0.6 M Li$_2$S in acetonitrile. The solution was cooled, filtered and washed with methanol to remove the LiCl formed. This was then followed by an ether wash and the product dried on a Bucher funnel in a dry box. The resulting product was gold-brown and gave an x-ray pattern of TiS$_2$ with no further treatment.

EXAMPLE 3

Preparation of NbS$_2$ (IaS$_2$)

This procedure is applicable to those transition metals of Group Vb which form pentahalides (Vb and Ta) and the example is given for niobium pentachloride:

To a solution of 10 millimoles of NbCl$_5$ (2.68 g) in 50 ml tetrahydrofuran was added 1.15 g lithium sulfide (25 millimoles) and the reaction stirred in the dry box overnight. The dark product obtained on filtration was shown to contain 60% by weight NbS$_{1.97}$.

EXAMPLE 4

Preparation of Molybdenum Disulfide

Addition of 10 millimoles of molybdenum tetrachloride and 20 millimoles of lithium sulfide to 30 ml THF with stirring results in a fine black solid which on filtration and drying contains 70% by weight/MoS$_2$. Most of the additional weight (60%) can be attributed to solvent which can be removed by heating to ca 150° C. and pumping (1 torr).

EXAMPLE 5

Stable Homogeneous Dispersions

If the reactions TiCl$_4$+A$_2$S herein described are carried out in appropriate media, stable homogeneous dispersions of TS$_2$ in the liquid result (either accompanied or in the absence of the precipitated solid). For instance, if propylene carbonate (PC) is used as solvent, the supernatant phase will be a dark brown opaque dispersion which is unchanged on filtration (medium frit funnel) and which does not settle out over a period of weeks or months. Alternatively, if in addition to a nondispersing solvent (such as THF) a dispersing agent such as pyridine (or alkylamines) is initially present a similar dispersion will result. Murphy and Hull (*J. Chem. Phys.* 62 973 (1975)) have described dispersions of TaS$_2$ in aqueous media which are considerably less stable due to eventual decomposition of the sulfide by water (hydrolysis). In nonaqueous solutions such as those described in the instant invention such decomposition does not occur and stability remains for months.

The reaction of a solution of TiCl$_4$ in excessive trihexylamine and tetrahydrofuran with hydrogen sulfide provides another example of a means of dispersing the product TiS$_2$ in the media. The presence of the amine in the reaction mileau serves to disperse the extremely fine particles of the product they form. The dichalcogenides formed in such dispersions may be adsorbed on high surface area carbons, refractory oxides and high surface area basic or acidic solids such as CaO, MgO, Al₂O₃ silica-alumina, the solution clearing with time.

EXAMPLE 6

Metal-Rich Products for V and Nb

Attempts to prepare stoichiometric disulfides of vanadium and niobium via high temperature (>400° C.) techniques result in metal-rich products due to the vapor pressure of sulfur at elevated temperatures. By using the ambient temperature method described in this invention, essentially stoichiometric 2:1 sulfur to metal products result. Evidence (besides verifying analysis) is found in the behavior of our products on heating to 100° C. In this situation, sulfur is evolved and can clearly be visually perceived on the cooler parts of the tubes.

EXAMPLE 7

Open Circuit Voltage of TiS₂ Electrode 1 gram of TiS$_2$ prepared in TMF by the instant process was pressed into an aluminum grid to make a cathode. The open circuit voltage of this cathode was measured against Li° in a LiClO$_4$/THF/DME electrolyte and gave a value of 2.55 v and discharged to give 1.80 v and could be recharged. These voltages correspond to TiS$_2$ (2.55 v) and LiTiS$_2$ (1.80 v) further proof of the TiS$_2$ composition.

EXAMPLE 8

TiS₂ Gel and Glass Formation

To 40 mmol trihexylamine in 25 ml tetrahydrofuran, 10 mmol TiCl$_4$ was added. Then anhydrous hydrogen sulfide was sparged into the solution at a flow rate of about 1–5 cc/sec for five minutes. In the course of this addition, the solution became dark and somewhat more viscous. After the addition, the dark mixture was allowed to sit at room temperature overnight, resulting in a black gel which, if pumped and heated to greater than 300° C. yielded a black glassy solid having no x-ray powder diffraction pattern. Scanning electron microscopy (SEM) verified that the product was a glassy phase, and x-ray fluorescence analysis showed titanium and sulfur.

EXAMPLE 9

Ammonia Uptake

The transition metal dichalcogenides are known to absorb ammonia to form 1:1 products (U.S. Pat. No. 3,766,064, F. R. Gamble, R. A. Klemm and E. F. Ullman). The rate of this reaction depends on the surface area of the solid dichalcogenide (if ammonia vapor at ambient conditions is used). For instance, 100 mesh TiS$_2$ requires several days to react completely with ammonia. The TiS$_2$ prepared by the method outlined in Example 1, when contacted with ammonia vapor under ambient conditions in a gas buret absorbed one mole within five minutes (no more was picked up).

EXAMPLE 10

Reaction with n-Butyllithium

In a recent patent application (Ser. No. 817,630), it was disclosed that a general reaction of the Group IVb and Vb transition metal dichalcogenides is the formation of adducts of lithium using n-butyllithium. The disulfide products of the reaction described herein reacted rapidly with n-butyllithium to form such adducts:

| Reaction Product | Li Uptake From n-Butyllithium |
|---|---|
| TiS$_2$ | 1.09 |
| VS$_2$ | 1.48 |

EXAMPLE 11

Use of VS₂ (as produced) in a Li Battery as Cathode

VS$_2$ is not known as a stoichiometric compound and has not been prepared by methods of the prior art. Such material prepared by the instant process, however, was reacted with η-butyllithium to give a composition Li$_X$VS$_2$ (0<X<1.5). The starting material has a 2:1 sulfur/vanadium ratio. The starting VS$_2$ has an open circuit voltage of about 2.45 volts and the lithiated material has an open circuit voltage of 1.80 volts against lithium. The reaction of n-butyllithium (Wittingham & Dines Mat. Res. Bull 10 287 (1975) and the favorable charged/discharged voltage make VS$_2$/LiVS$_2$ an attractive cathode material.

Vanadium sulfide compounds prepared in the past and characterized as being VS$_2$ were all prepared via high temperature techniques, i.e. over 400° C.

Experiments conducted in the course of developing the instant process have indicated that high temperature preparation of vanadium sulfides yield compounds of the formula V$_S$S$_8$, V$_2$S$_3$, etc. and not VS$_2$.

Vanadium sulfide compositions which are not VS$_2$ have been found to react with n-butyllithium only to the extent of 0.2 M maximum.

Such materials cannot be utilized as battery cathodes since the miniscule lithium take-up dramatically effects voltage consideration and charge-discharge abilities.

Vanadium sulfides prepared by the process of the instant invention, however, are of the formula VS$_2$ and take up 1.5 eq lithium upon admixture with n-butyllithium. Such behavior, which is similar to that of TiS$_2$ indicates that both structurally and stoichiometrically TiS$_2$ and VS$_2$ prepared by the instant process are similar indeed, that VS$_2$ as such can be prepared. Supposed compounds of VS$_2$ prepared by prior art high temperature techniques differed markedly from TiS$_2$ (and from the VS$_2$ as now prepared), strong evidence that the compounds of the prior art are not truly VS$_2$.

EXAMPLE 12

Use as a Catalyst

NbS$_2$ prepared by this method is a more active catalyst for the hydrodesulfurization of dibenzothiophene at the same temperature (400°) and pressure (450 psi) than NbS$_2$ prepared from the elements via prior art techniques. Thus, layered compounds prepared in this manner are more active than any previously prepared compounds.

Rate Constants

NbS$_2$: prepared from elements K=8.7×10$^{-7}$ gm$^{-1}$ sec$^{-1}$ NbS$_2$: prepared as above K=13×10$^{-7}$ gm$^{-1}$ sec$^{-1}$ TiS$_2$ in Group IVb is more active prepared in the instant manner than by bulk methods. Also, VS$_2$ in Group Vb was active as a catalyst. VS$_2$ cannot be prepared in bulk by previously known methods as stated above.

EXAMPLE 13

Formation of an Intercalation Complex Directly

Ordinarily, using large crystal size transition metal dichalcogenides prepared by other means, sterically restricted amines such as 4-t-butylpyridine cannot intercalate between the layers and form inclusion compounds (Gamble et al, Science Vol. 174, pg 493, 1971). However, if during the precipitation reactions described herein, such molecules are present, they will be included into the solid product which forms in situ. As an example, if 5 mmol of 4-t-butylpyridine is present in the THF solution when 10 mmol of $TiS_2$ is prepared via $TiCl_4$ and $Li_2S$, the product, a dry dark solid powder, will contain the amine.

EXAMPLE 14

Preparation of $US_2$ under Ambient Conditions (in Drybox)

A green solution was made up containing 3.70 g of $UCl_4$ (10 mmoles) in 100 ml THF. To this solution was added 0.92 g (20 mmoles) $Li_2S$ with stirring. The color darkened to brown and the reaction was stirred a day at room temperature. On filtering, washing with 20 ml THF and drying of the precipitate 3.07 g black powder (102% yield) resulted. An x-ray diffraction of this product showed no reflections due to the fine particle size.

In "Handbook of Preparative Inorganic Chemistry" V. 2 (second edition) edited by G. Brauer (Academic Press, 1965) on page 1446 is detailed the typical preparation of $US_2$ (from $UCl_4 + H_2S$) at 600°–700°.

EXAMPLE 15

$Li_2Se + ZrCl_4$, $ZrSe_2$

Into 50 ml acetonitrile, 10 millimoles zirconium tetrachloride is added and then, with stirring 20 millimoles of lithium selenide is added portionwise. After allowing to stir several hours, the solid product is collected on a filter and washed with acetonitrile and dried. Thus, 10 millimoles of zirconium diselenide is afforded.

EXAMPLE 16

Polysulfide Preparation

Polysulfide may be prepared by adding the proper stoichiometric amount of sulfur with the $Li_2S$, as in the previous examples, to yield the appropriate $Li_2S_n$ for the desired reaction. Two examples of the preparation of known polysulfides are shown below:

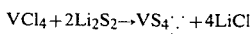

$VCl_4 + 2Li_2S_2 \rightarrow VS_4 \downarrow + 4LiCl$

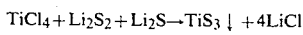

$TiCl_4 + Li_2S_2 + Li_2S \rightarrow TiS_3 \downarrow + 4LiCl$

However, this method is not limited to known polysulfides but is a route to previously unknown polysulfides such as $TiS_4$, $TaS_6$ etc. This method also yields dispersions, gels, etc. of these materials whose properties will not be governed by the chain-like morphology of the polysulfides.

EXAMPLE 17

Neat Preparation of Crystalline $TiS_2$ from $NH_3$, $H_2S$ and $TiCl_4$

Into a three-necked flask, a quantity of (approximately 5 grams) of $(NH_4)HS$ or $(NH_4)_2S$ was prepared by flowing in $NH_3$ gas and $H_2S$ gas. To the resulting white solid 3.8 gms of $TiCl_4$ (20 mmol) was added dropwise. A reaction immediately occurred yielding a black-brown solid, which was $TiS_2 + (NH_4)Cl$. This black-brown solid was removed from the flask and sealed in vacuum in a 20 mm diameter quartz tube which was 25 in. long. The tube was placed in a temperature gradient with one end at 380° C. and the other at 100° C. for one day. $(NH_4)Cl$ sublimed and condensed at the colder end thus effecting separation. At the hot end, the $TiS_2$ annealed yielding a perfect crystalline x-ray powder pattern.

What is claimed is:

1. A method for the preparation of chalcogenides of the formula $MX_y$ wherein M is a metal selected from the group consisting of IVb, Vb, molybdenum and tungsten transition metals of the Periodic Table of the Elements, X is selected from the group consisting of sulfur, selenium and tellurium, and y is a number ranging from about 2 to about 4, which comprises reacting in the absence of aqueous protic solution a solution of a transition metal salt, the transition metal being selected from the group consisting of Group IVb, Vb, molybdenum, and tungsten with a source of sulfide, selenide or telluride ions which source is selected from the group consisting of $Li_2X$, $Na_2X$, $K_2X$, $LiHX$, $NaHX$, $KHX$, $(NH_4)_2X$, $(NH_4)HX$, $(RNH_3)_2X$, $(RR'NH_2)_2X$, $(RR'R''NH)_2X$, wherein R, R' and R'' are the same or different and are selected from the group consisting of $C_1$ to $C_{20}$ alkyl and $C_6$ to $C_{20}$ aryl groups and X is the chalcogen selected from the group consisting of sulfur selenium and tellurium at a temperature of from $-78°$ C. to $400°$ C. for a time sufficient for reaction to occur.

2. The method of claim 1 further characterized by isolating the product after the reaction occurs.

3. The method of claim 2 further characterized by the step of contacting the isolated product with an intercalating solvent, thereby forming an intercalated chalcogenide and then driving the solvent off by means of heat, thereby generating a chalcogenide of increased surface area.

4. The method of claim 3 wherein the intercalating solvent is selected from the group consisting of pyridine, ammonia, $C_1$–$C_{20}$ amines, aldehydes, ketones, amides, heterocyclic bases, and amidines, and the solvent is subsequently driven off at a temperature of between 75°–200° C.

5. The method of claim 1 wherein the product is a stoichiometric chalcogenide.

6. The method of claim 1 further characterized by using a nonaqueous, aprotic solvent.

7. The method of claim 6 wherein the nonaqueous, aprotic solvent is selected from the group consisting of acetonitrile, benzonitrile, propionitrile, acetone, $C_1$–$C_{20}$ alkyl halides, $C_6$–$C_{20}$ arylhalides, 1,2-dimethoxyethane, diglyme, N-methylformamide, dimethylformamide, aromatics of $C_6$–$C_{20}$ carbons, pyridine, $C_5$ to $C_{12}$ alkanes, $C_4$–$C_8$ ethers propylene carbonate, and anhydrous acids.

8. The method of claim 7 wherein the anhydrous acids are formic acid and glacial acetic.

9. The method of claim 1 wherein the product is a dichalcogenide.

10. The method of claim 1 wherein the product is a disulfide.

11. The method of claim 1 wherein the temperature of reaction is between 25° to 300° C.

12. The method of claim 1 wherein the product is $VS_2$.

13. The method of claim 2 wherein the isolation step utilizes excess solvent.

14. The method of claim 2 wherein the isolation step utilizes vacuum pumping to draw off volatile by-products.

15. The method of claim 2 further characterized by including the step of annealing the isolated product at a temperature of over about 450° C. thereby generating a product having low surface area, moderate particle size and high crystallinity.

16. The method of claim 1 wherein the anion of the metal salt is halide, acetate, carboxylate, perfluorocarboxylate, acetylacetonate, heterofluoroacetylacetonate, sulfate and nitrate, wherein the carbonaceous moiety of the anion is a $C_1$ to $C_8$ hydrocarbon or fluorocarbon.

17. The method of claim 1 wherein the chalcogen is sulfur.

18. The method of claim 1 wherein the product is $TiS_2$.

19. The method of claim 1 wherein the source of sulfur, selenium and tellurium is selected from $Li_2S$, $(NH_4)_2S$, $Na_2S$, $Li_2Se$, $Li_2Te$ and $(NH_4)_2Se$.

20. The method of claim 1 wherein R, R' and R'' are the same or different and are selected from the group consisting of $C_1$ to $C_8$ alkyl and $C_6$ to $C_{12}$ aryl.

21. The method of claim 1 wherein the anion of the transition metal salt is chloride and the source of sulfur, selenium or tellurium is $Li_2S$.

22. Method for the direct formation of intercalation complexes comprising generating di- or poly-chalcogenides by the method of claim 11 in the presence of intercalating agents wherein said intercalating agent is initially present in the reaction mixtures as the solvent.

23. A method for the simultaneous production of a cathode of the formula $MX_y$ wherein M is a transition metal selected from the group consisting of Group IVb, Vb, molybdenum and tungsten, X is selected from the group consisting of sulfur, selenium and tellurium and y is a number from about 2 to about 4 and electrolytes which comprise:
   (1) mixing a transition metal salt wherein the transition metal is selected from the group consisting of Group IVb, Vb, molybdenum and tungsten, with a nonaqueous solvent;
   (2) mixing the solution of step (1) with a strong acid HY wherein Y is selected from the group consisting of $Cl^-$, $Br^-$, $I^-$, $ClO_4^-$, $PF_6^-$, $BF_4^-$, $SO_3CF_3^-$;
   (3) mixing the solution of step (2) with a lithium salt of sulfur, selenium or tellurium at a temperature of from 0° to 400° C. thereby generating the $MX_y$ cathode and the electrolyte LiY.

24. The method of claim 23 wherein the anion of the metal salt is halide, acetate, carboxylate, perfluorocarboxylate, acetylacetonate, heterofluoroacetylacetonate, sulfate and nitrage, wherein the carbonaceous moiety of the anion is a $C_1$ to $C_8$ hydrocarbon or fluorocarbon.

* * * * *